UNITED STATES PATENT OFFICE.

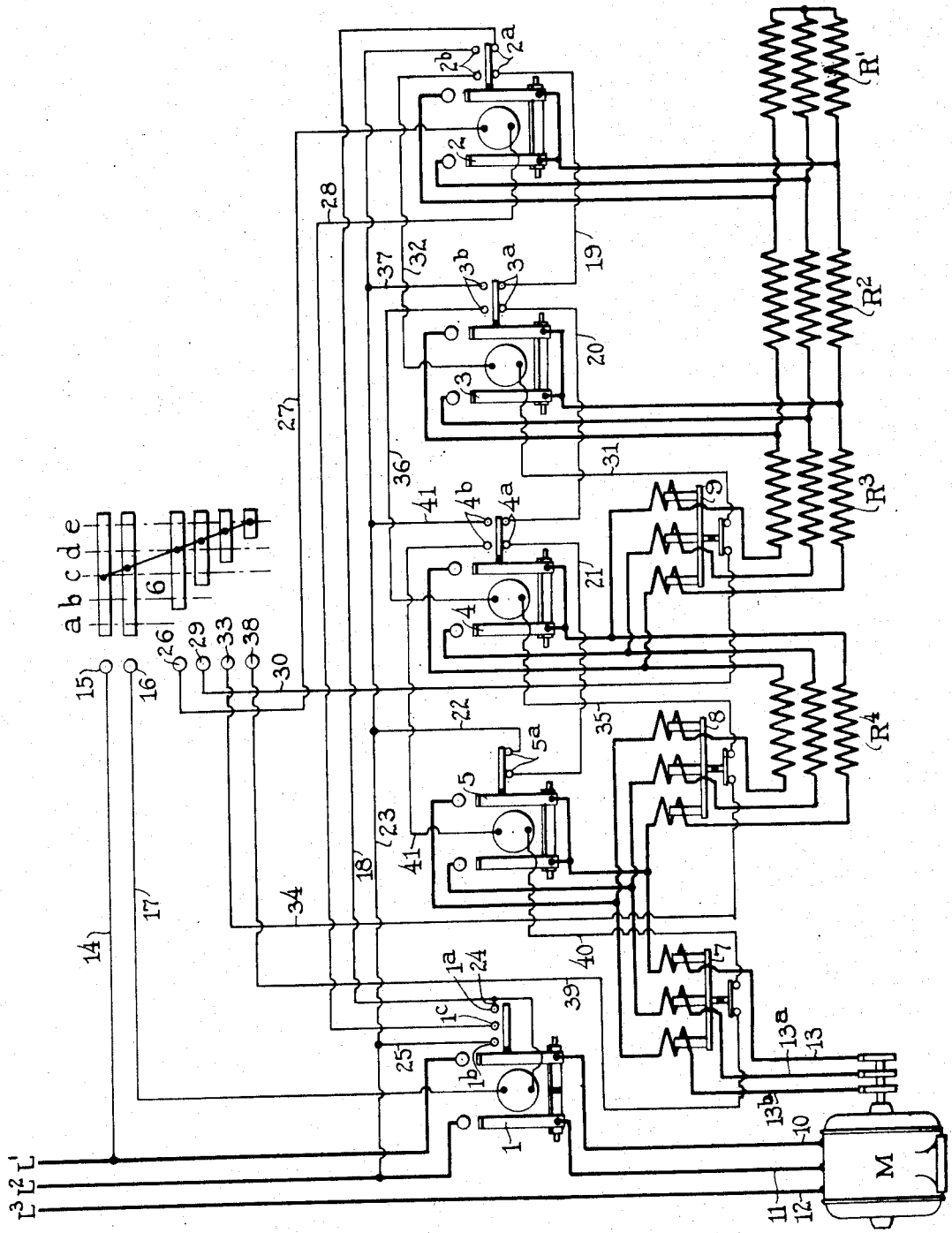

NIELS L. MORTENSEN, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROL.

1,309,366.  Specification of Letters Patent.  Patented July 8, 1919.

Application filed April 16, 1917. Serial No. 162,360.

*To all whom it may concern:*

Be it known that I, NIELS L. MORTENSEN, a citizen of Denmark, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

This invention relates to motor controllers.

In practice, where motors are frequently subjected to heavy but temporary overloads, as in excavating service, it is a common expedient to utilize a plurality of jamming relays to reinsert in the motor circuit during the overload periods, portions of starting resistance, all of said relays being at all times subjected to the motor current and calibrated for response under different overload conditions, with a view to graduating the reinserted resistance. However, the control thus provided has proven unreliable and inefficient, notably in that a number or all of the relays tend to respond simultaneously upon the occurrence of overloads in excess of those for which the more sensitive relays are calibrated, which often results in the inclusion of a needless and objectionable amount of resistance.

The present invention relates more particularly to controllers for the purpose discussed and has among its objects to provide a controller wherein the jamming relays will be limited to response sequentially even under maximum overload conditions.

A further object is to provide a controller wherein the jamming relays may be calibrated as desired and without necessity for the heretofore required careful adjustments of the relays relative to one another.

Other objects and advantages will hereinafter appear.

The accompanying drawing illustrates diagrammatically an embodiment of the invention for control of an alternating current motor and the same will now be described, it being understood that the invention may be embodied in other forms for control of both A. C. and D. C. motors.

More specifically, the drawing shows a slip ring alternating current motor M to be supplied with current from lines $L'$, $L^2$ and $L^3$ through an electro-responsive main switch 1 and to be controlled through the medium of resistances $R'$, $R^2$, $R^3$ and $R^4$, each of the same having a plurality of sections for inclusion in all phases of the slip ring circuit of the motor. The resistances are arranged in series and adapted to be progressively excluded from circuit for acceleration of the motor by electro-responsive switches 2, 3, 4 and 5, controllable together with the main switch 1 by a drum controller 6. In this connection it is to be understood that series relays may also be provided for controlling the accelerating switches but the same have been omitted for simplicity of illustration.

The drawing further discloses a plurality of jamming or overload relays 7, 8, 9 responsive to the rotor current for deënergizing certain of said accelerating switches to reinsert corresponding sections of starting resistance in the slip ring circuit. However, the arrangement is such that the windings of relays 8 and 9 are normally excluded from circuit and such as to render the inclusion of said windings necessarily sequential.

Briefly described the circuit arrangement is such that upon movement of the drum controller 6 to the first or starting position $a$, main switch 1 is energized and responds for completing the motor circuit, at the same time completing a maintaining circuit for itself and establishing the energizing circuit of the first accelerating switch 2 but subject to movement of the drum controller to position $b$. The accelerating switch 2 upon responding excludes resistance $R'$ from the slip ring circuit, at the same time establishing the energizing circuit of the succeeding accelerating switch 3 but subject to further movement of the drum controller, and such action of switch 2 is typical of all of the accelerating switches. Furthermore, switches 4 and 5 upon responding, respectively short circuit the windings of relays 9 and 8. Relay 7, however, has its windings permanently included in the rotor circuit and upon response to an overload following the operation above described, deënergizes switch 5 for reincluding the resistance $R^4$ and the windings of relay 8 in circuit. Thereupon relay 8 is rendered sensitive to a continued overload and if it responds it deënergizes switch 4 for reincluding resistance $R^3$ and the windings of relay 9. This in turn renders the relay 9 sensitive to a continued overload and if it responds it deënergizes switch 3 to reinclude resistance R².

Thus, irrespective of the magnitude of an overload the response of the several relays is rendered dependent upon continuance of such overload for a definite time so that if normal conditions are restored upon response of one or two relays the remainder will not respond. And here it is to be noted that the relays may be calibrated alike or calibrated for response under different current conditions, as desired.

The power circuits are as follows: from line L' through main switch 1 to the motor terminal 10, from line L² through the main switch 1 to the motor terminal 11, and from line L³ directly to the motor terminal 12. The lines 13, 13ª, 13ᵇ of the slip ring circuit each extend from the motor through the windings of relays 7 and 8 in series, thence through the resistance R⁴ and a winding of relay 9 and finally through resistance sections R³, R² and R', said lines being interconnected beyond the latter. The accelerating switches are arranged to short circuit the resistances and relay windings at the following points: switch 2 between resistance sections R² and R'; switch 3 between resistance sections R³ and R²; switch 4 between the resistance section R⁴ and the phase winding of relay 9 in advance of resistance section R³; and switch 5 between the phase windings of relays 7 and 8 in advance of resistance section R⁴.

The control circuits may be traced as follows: The energizing circuit of the main switch extends from line L' through conductor 14 and contacts 15 and 16 of controller 6, thence by conductor 17 through the winding of said main switch by conductors 18, 19, 20 and 21 through the respective down contacts 2ª, 3ª, 4ª and 5ª of accelerating switches 2, 3, 4 and 5 in series, and by conductors 22 and 23 to line L². The maintaining circuit of the main switch extends from the controller through the winding of said switch to conductor 18 as above traced, thence by conductor 24 through the up contacts 1ª and 1ᵇ of said main switch and by conductors 25 and 23 to line L². The energizing circuit of accelerating switch 2 extends from controller contact 26 by conductor 27 through the winding of said accelerating switch, thence by conductor 28 through the up contacts 1ᶜ and 1ᵇ of main switch 1 and by conductors 25 and 23 to line L². The energizing circuit of accelerating switch 3 extends from controller contact 29 by conductor 30 through overload relay 9, by conductor 31 through the winding of said accelerating switch, thence by conductor 32 through the up contacts 2ᵇ of accelerating switch 2, and by conductor 23 to line L². The energizing circuit of accelerating switch 4 extends from controller contact 33, by conductor 34 through overload relay 8, by conductor 35 through the winding of said accelerating switch, thence by conductor 36 through the up contacts 3ᵇ of accelerating switch 3 and by conductors 37 and 23 to line L². The energizing circuit of accelerating switch 5 extends from controller contact 38, by conductor 39 through overload relay 7 and by conductor 40 through the winding of said accelerating switch, thence by conductor 41 through the up contacts 4ᵇ of accelerating switch 4 and by conductors 41 and 23 to line L².

What I claim as new and desire to secure by Letters Patent is:

1. In a motor controller, in combination, a resistance and means to include different amounts of said resistance in circuit with the motor upon the occurrence of overloads, including a plurality of overload devices each to effect reinclusion of a portion of the resistance, certain of said devices being dependent for response upon prior response of another of said devices.

2. In a motor controller, in combination, a resistance for the motor circuit, a plurality of switches for gradually excluding and reincluding said resistance, and a plurality of overload devices respectively controlling certain of said switches and each responsive to effect reinclusion of a definite amount of said resistance, certain of said devices being dependent for response upon prior response of another of said devices.

3. In a motor controller, in combination, a plurality of resistance sections for connection in circuit with the motor, a plurality of switches for effecting progressive exclusion of said sections for motor acceleration, and a plurality of overload devices respectively controlling said switches to effect progressively reinclusion of said resistance sections under certain electrical conditions, certain of said devices being rendered ineffective by resistance excluding action of certain of said switches, whereby response of said latter devices is dependent upon prior response of other of said devices.

4. In a motor controller, in combination, a plurality of resistances for connection in circuit with the motor, a plurality of switches operable for effecting progressive exclusion and inclusion of said resistances for motor regulation, and a plurality of overload relays respectively controlling the resistance including action of said switches, one of said relays having its winding permanently in circuit and the other said relays having their windings arranged in series with said resistances, for exclusion from circuit therewith by said switches, whereby response of said latter relays is dependent upon prior response of said former relay.

5. In a motor controller, in combination, a plurality of resistances for connection in circuit with the motor, a plurality of electro-responsive switches operable progressively and each effective for excluding or including one of said resistances and a plurality of overload relays each operable under certain conditions to deënergize one of said switches for including one of said resistances in circuit, one of said relays being permanently subjected to the motor current and the other relays having their windings arranged to be excluded and included by said switches respectively upon resistance excluding or including action thereof, whereby response of said relays is rendered necessarily sequential.

In witness whereof, I have hereunto subscribed my name.

NIELS L. MORTENSEN.